United States Patent
Zhang et al.

(10) Patent No.: US 12,017,960 B1
(45) Date of Patent: Jun. 25, 2024

(54) PREPARATION METHOD OF HEAT-RESISTANT ADHESIVE OF SILICON-BORON-CARBON-ZIRCONIUM MODIFIED ALUMINUM-ZIRCONIUM PHOSPHATE FOR ZIRCONIUM OXIDE CERAMICS

(71) Applicant: Civil Aviation University of China, Tianjin (CN)

(72) Inventors: Qingsong Zhang, Tianjin (CN); Mingchao Wang, Tianjin (CN); Haijun Zhang, Tianjin (CN)

(73) Assignee: Civil Aviation University of China, Tianjin (CN)

( * ) Notice: Subject to any disclaimer, the term of this patent is extended or adjusted under 35 U.S.C. 154(b) by 0 days.

(21) Appl. No.: 18/430,662

(22) Filed: Feb. 2, 2024

(30) Foreign Application Priority Data

Apr. 27, 2023  (CN) .......................... 202310464500.X

(51) Int. Cl.
| | |
|---|---|
| *C04B 28/34* | (2006.01) |
| *C04B 14/02* | (2006.01) |
| *C04B 14/32* | (2006.01) |
| *C04B 14/34* | (2006.01) |
| *C04B 37/00* | (2006.01) |
| *C04B 111/00* | (2006.01) |

(52) U.S. Cl.
CPC .......... *C04B 28/344* (2013.01); *C04B 14/024* (2013.01); *C04B 14/323* (2013.01); *C04B 14/34* (2013.01); *C04B 37/003* (2013.01); *C04B 2111/00637* (2013.01); *C04B 2237/02* (2013.01); *C04B 2237/348* (2013.01)

(58) Field of Classification Search
CPC ... C04B 28/344; C04B 14/024; C04B 14/323; C04B 14/34; C04B 37/003; C04B 2111/00637; C04B 2237/02; C04B 2237/348
See application file for complete search history.

(56) References Cited

PUBLICATIONS

Civil Aviation University of China (Applicant), Claims (allowed) of CN202310464500.X, Apr. 27, 2023.
CNIPA, Notification to grant patent right for invention in CN202310464500.X, Feb. 28, 2024.

*Primary Examiner* — Anthony J Green

(57) ABSTRACT

A preparation method of heat-resistant adhesive of silicon-boron-carbon-zirconium modified aluminum-zirconium phosphate for zirconium oxide ceramics is provided. The high-temperature adhesive can generate various high-temperature resistant phases such as zirconia, aluminum phosphate, zirconium phosphate and aluminum borate in situ of the high-temperature adhesive at high temperatures. As the processing temperature increases, the content of zirconia in the high-temperature adhesive continuously increases, and the composition tends to form a stable composite phase mainly composed of aluminum phosphate and zirconia, which makes the composition of the high-temperature adhesive closer to that of zirconia ceramics.

6 Claims, 10 Drawing Sheets

PREPARATION METHOD OF HEAT-RESISTANT ADHESIVE OF SILICON-BORON-CARBON-ZIRCONIUM MODIFIED ALUMINUM-ZIRCONIUM PHOSPHATE FOR ZIRCONIUM OXIDE CERAMICS

TECHNICAL FIELD

The disclosure relates to the field of preparing technologies for high-temperature adhesive of aluminum-zirconium phosphate, and particularly to a preparation method of heat-resistant adhesive of silicon-boron-carbon-zirconium modified aluminum-zirconium phosphate for zirconium oxide ceramics.

BACKGROUND

Due to the high brittleness, weak ductility, and high processing difficulty of ceramic materials, large-sized or complex shaped work pieces of zirconia are difficult to form at one time. In order to reduce production costs, the complex work pieces used in engineering are mostly connected by simple ceramic components, which makes related connection processes highly valued. Zirconia ceramics have a high coefficient of thermal expansion and fracture toughness, and their connection issues involve defense industries such as aviation, aerospace, navigation, and energy. Currently, brazing is the mainstream connection method for the zirconia ceramics, and zirconia ceramic connectors prepared through the brazing have extremely high strength. Although the brazing provides high connection strength, this process requires atmosphere protection and generally requires a vacuum environment, which requires expensive brazing equipment. Due to the limitations of device specifications, connecting work pieces is usually small, and this process is not suitable for on-site connections of large components and difficult to reach parts such as the inner wall of pipelines. Therefore, the development of a connection technology for the zirconia ceramics that is suitable for on-site operations, convenient, and heat-resistant is of great significance.

Among various connecting methods, high-temperature resistant connecting technology has the advantages of high temperature resistance limit, excellent interface fatigue resistance, high compatibility with ceramic substrates, and high degree of interface connecting due to its ability to achieve highly ceramic transformation. Therefore, it is very suitable for the connecting of high-temperature resistant ceramics. For example, the installation, fixation, and sealing of insulation tiles/cotton/cloth, as well as the insulation and sealing of the engine. High temperature resistant adhesives are mainly divided into two categories: one is a high temperature resistant adhesive of modified polymer based ceramic precursor, and the other is a high temperature resistant adhesive inorganic ceramic represented by phosphate and silicate. Although the high temperature resistant adhesive of modified polymer based ceramic precursor exhibits excellent temperature resistance after ceramic coating, its strength is extremely low during the ceramic coating process, making it almost unable to bear weight and prone to cracking. Simultaneously, the process of polymer cracking can result in low structural density, numerous defects, and limited connecting strength of the adhesive layer. In contrast, the high-temperature resistant adhesive of inorganic ceramic has higher temperature limits, higher structural retention, good fatigue resistance, excellent corrosion resistance, and long service life. Among them, the high-temperature resistant of inorganic adhesive based on phosphate is a chemically connected adhesive that can be cured and cross-linked at room temperature by reacting phosphoric acid with metal oxides or hydroxides, which can maintain excellent heat resistance throughout the entire temperature range and can withstand high temperatures up to 1700° C. Meanwhile, the high-temperature resistant of inorganic adhesive based on phosphate also has the characteristics of high temperature strength and low curing shrinkage rate, and is widely used in aerospace, fire resistance protection and other fields. However, there is a significant difference in the physical and chemical properties between the current high-temperature resistant of inorganic adhesive based on phosphate and the zirconia ceramic matrix, and there are few reports that it can provide a high-strength high-temperature resistant adhesive based on phosphate for zirconia ceramics during multiple cold and hot cycles. Based on the above analysis, there is an urgent need to prepare a new high-temperature resistant adhesive specifically for zirconia ceramics.

SUMMARY

The objectives of the disclosure are to provide a preparation method of heat-resistant adhesive of silicon-boron-carbon-zirconium modified aluminum-zirconium phosphate for zirconium oxide ceramics to solve the above problems.

To achieve the above objectives, the disclosure provides the following technical solution: a preparation method of heat-resistant adhesive of silicon-boron-carbon-zirconium modified aluminum-zirconium phosphate for zirconium oxide ceramics includes:

Step 1, adding a concentrated phosphoric acid into a three-necked flask, and placing the three-necked flask in a thermostat water bath cauldron for heating at a constant temperature in a range of 70-80° C., followed by adding water in the three-necked flask to dilute the concentrated phosphoric acid in the three-necked flask to obtain a diluted phosphoric acid with a concentration of 50-70%. Performing mechanical stirring on the diluted phosphoric acid at a rotation speed in a range of 250-350 revolutions per minute (r/min), and adding aluminum hydroxide into the diluted phosphoric acid during the performing mechanical stirring on the diluted phosphoric acid, to obtain a first mixed solution, a solid-liquid mass ratio of the aluminum hydroxide:the diluted phosphoric acid being in a range of 1:1.4-3.8. Performing mechanical stirring on the first mixed solution at a rotation speed in a range of 500-900 r/min for 6-8 hours for reacting, to thereby obtain a first reacted mixture. And filtering the first reacted mixture to remove residues from the first reacted mixture to thereby obtain an aluminum phosphate solution in milky white. An entire process of the reacting is performed under a condition of installing a condensation reflux device;

Step 2, transferring the aluminum phosphate solution obtained in step 1 into a magnetic driven reactor, performing stirring on the aluminum phosphate solution at a rotation speed in a range of 200-400 r/min, and adding zirconium hydroxide to the aluminum phosphate solution during the performing stirring on the aluminum phosphate solution, to obtain a second mixed solution, a molar ratio of zirconium in the zirconium hydroxide:aluminum in the aluminum phosphate solution being in a range of 1:1.8-3. Sealing the second mixed solution in the magnetic driven reactor, and performing stirring on the second mixed solution at a rotation speed in a range of 200-400 r/min under a temperature of 80-120° C. for 12-18 hours for reacting, to thereby obtain a second reacted mixture. And filtering the second reacted mixture to remove residues from the second reacted mixture, to thereby obtain an adhesive base solution in milky white;

Step 3, mixing a zirconium n-propoxide solution with an anhydrous ethanol solution to obtain a third mixed solution, a molar ratio of the zirconium n-propoxide solution:the anhydrous ethanol solution being in a range of 1:7-11. And then adding acetylacetone solution to the third mixed solution at a molar ratio of zirconium n-propoxide in the zirconium n-propoxide solution:acetylacetone in the acetylacetone solution being in a range of 1:1.5-2, followed by stirring at a rotation speed in a range of 400-500 r/min for 40-50 hours to obtain a zirconium gel solution;

Step 4, mixing a silicon powder, a graphite powder, and a boron carbide powder at a mass ratio of the silicon powder:the graphite powder:the boron carbide powder in a range of 3-5:1-1.5:2-4 to obtain a mixed powder. Then adding the mixed powder into the zirconium gel solution at a solid-liquid ratio of the mixed powder:the zirconium gel solution in a range of 1:10-15, followed by mechanical stirring at a rotation speed in a range of 500-700 r/min for 24-36 hours for reacting, to thereby obtain a third reacted mixture. Placing the third reacted mixture in an oven for drying the third reacted mixture at a temperature of 80-90° C. to thereby obtain a dried solid. And grinding the dried solid to obtain a reacted powder in brownish black;

Step 5, compressing, by using a tablet press, the reacted powder to obtain a cake-like solid at a pressure in a range of 2-4 megapascals (MPa). Then placing the cake-like solid in a tube furnace protected by an argon gas for cracking the cake-like solid to thereby obtain a calcined solid, a flow rate of the argon gas being in a range of 6-10 cubic centimeters per minute (cc/min), a period for the cracking being in a range of 2-4 hours, a temperature for the cracking being in a range of 450-550° C. And crushing and grounding the calcined solid to obtain a reactive silicon-boron-carbon-zirconium powder with a particle size corresponding to 200-300 meshes as an adhesive filler; and Step 6, mixing the adhesive base solution obtained in step 2 with the adhesive filler obtained in step 5 at a mass ratio of the adhesive base solution:the adhesive filler in a range of 4:1-5:1 to obtain a mixture. And performing mechanical stirring on the mixture at a rotation speed in a range of 600-800 r/min for 8-12 hours, to thereby obtain the heat-resistant adhesive of silicon-boron-carbon-zirconium modified aluminum-zirconium phosphate.

In an embodiment, each of the concentrated phosphoric acid and the aluminum hydroxide in step 1 is an analytical reagent (AR), a concentration of the concentrated phosphoric acid is 85%, a purity of the aluminum hydroxide is 99%, and a particle size of the aluminum hydroxide is in a range of 10-25 micrometers (μm). The reagents used in the reaction can be purchased from various chemical reagent manufacturers. In addition, the water in the step 1 can be any source of water and has no impact on the process.

In an embodiment, a purity of the zirconium hydroxide in step 2 is 97%.

In an embodiment, each of the zirconium n-propoxide solution, the anhydrous ethanol, and the acetylacetone solution in step 3 is an AR. A composition of the zirconium n-propoxide solution includes $C_{12}H_{48}O_4Zr$, a concentration of the zirconium n-propoxide solution is 70%, a concentration of the anhydrous ethanol is 99.7%, and a concentration of the acetylacetone solution is 99%.

In an embodiment, a particle size of the silicon powder in step 4 is 40-60 nanometers (nm), and particle sizes of the graphite powder and the boron carbide powder are in a range of 6-10 μm.

In an embodiment, a purity of the argon gas in step 5 is greater than 99.95%.

Compared with the related art, the beneficial effects of the disclosure are as follows.

1. The high-temperature adhesive of the disclosure can generate various high-temperature resistant phases such as zirconia, aluminum phosphate, zirconium phosphate and aluminum borate in situ of the high-temperature adhesive at high temperatures. As the processing temperature increases, the content of zirconia in the high-temperature adhesive continuously increases. Therefore, the composition tends to form a stable composite phase mainly composed of aluminum phosphate and zirconia, which makes the composition of the high-temperature adhesive closer to that of zirconia ceramic.

2. The physicochemical properties of the high-temperature adhesive of the disclosure are closer to that of the zirconia ceramic at the high temperature, and the difference in thermal expansion coefficients between the high-temperature adhesive treated at 1500° C. and the zirconia ceramic is less than $3 \times 10^6$ per Kelvin ($K^{-1}$). A Vickers hardness of the high-temperature adhesive treated at 1500° C. is as high as 977.8 Vickers-hardness (HV), which is close to an HV of the zirconia ceramic of 1176 HV.

3. The high-temperature adhesive of the disclosure can provide a connecting strength of no less than 10 megapascals (MPa) for the zirconia ceramic after being treated at a temperature in a range of 500-1500° ° C. With the increase of processing temperature, the connecting strength significantly improves, with a connecting strength of up to 45 MPa after being treated at 1500° C.

4. The interface connection effect between the high-temperature adhesive of the disclosure and the zirconia ceramic is good. After the high-temperature treatment, the high-temperature adhesive has a high degree of connection with zirconia ceramic, a thick and full adhesive layer, high density, and no large cracks or large pores are generated.

Figure 1:
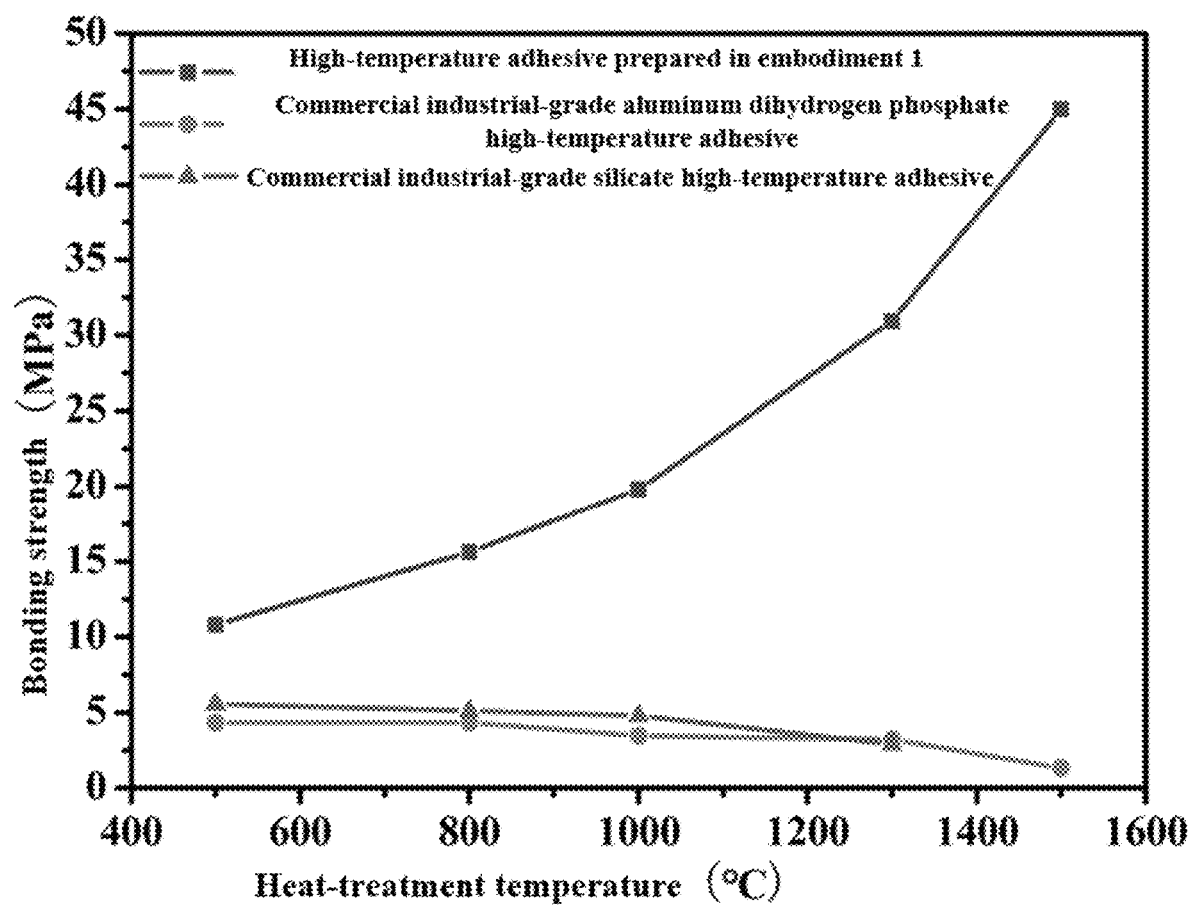
FIG. 1 illustrates a comparison of connecting strengths of zirconia ceramics with a high-temperature adhesive prepared in an embodiment 1, a commercial industrial-grade aluminum dihydrogen phosphate high-temperature adhesive, and a commercial industrial-grade silicate high-temperature adhesive after treatments in different temperature.
Figure 2:
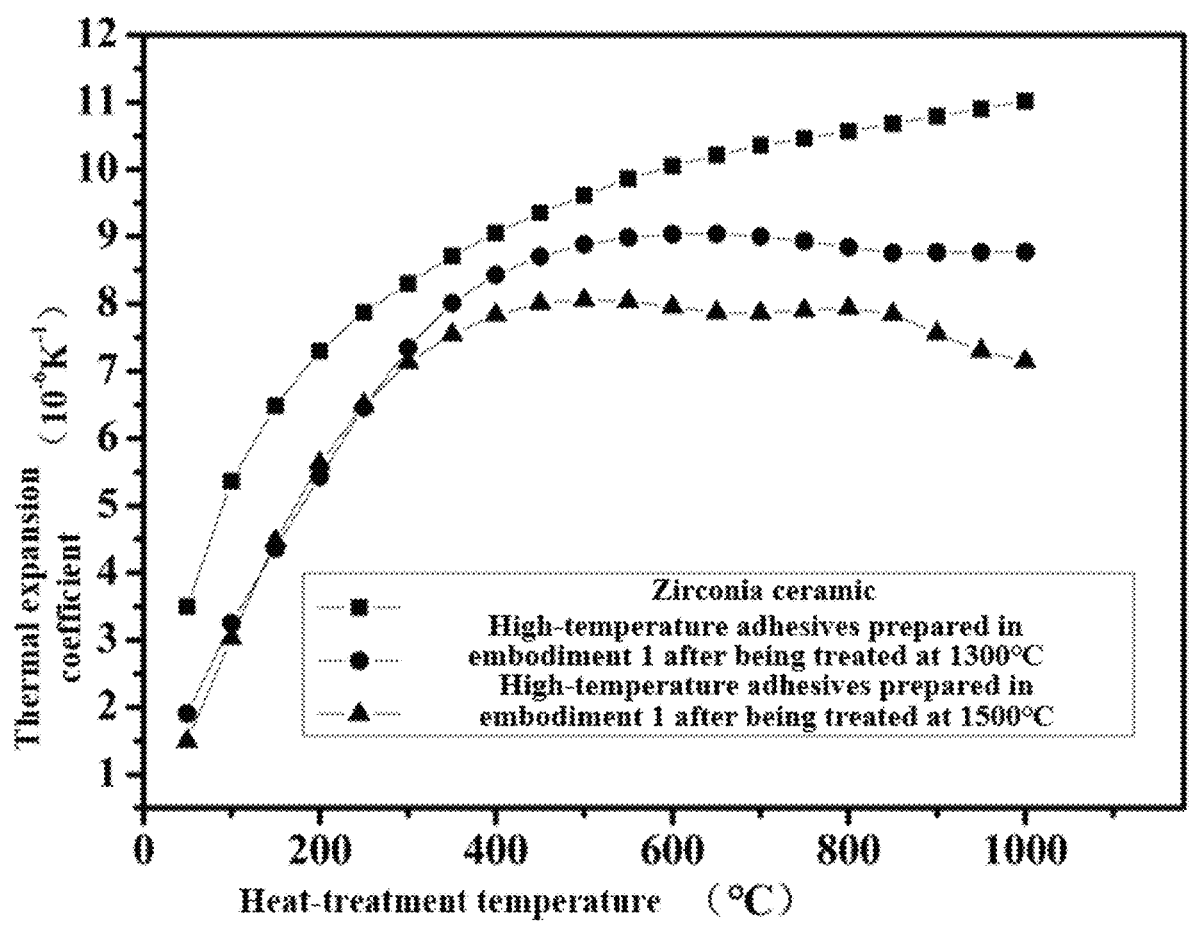
FIG. 2 illustrates curves of coefficients of thermal expansion under temperatures from a room temperature to 1000° C. of the high-temperature adhesive prepared in the embodiment 1 after being treated at 1300° C., the high-temperature adhesive prepared in the embodiment 1 after being treated at 1500° ° C., and the zirconia ceramic.
Figure 3:
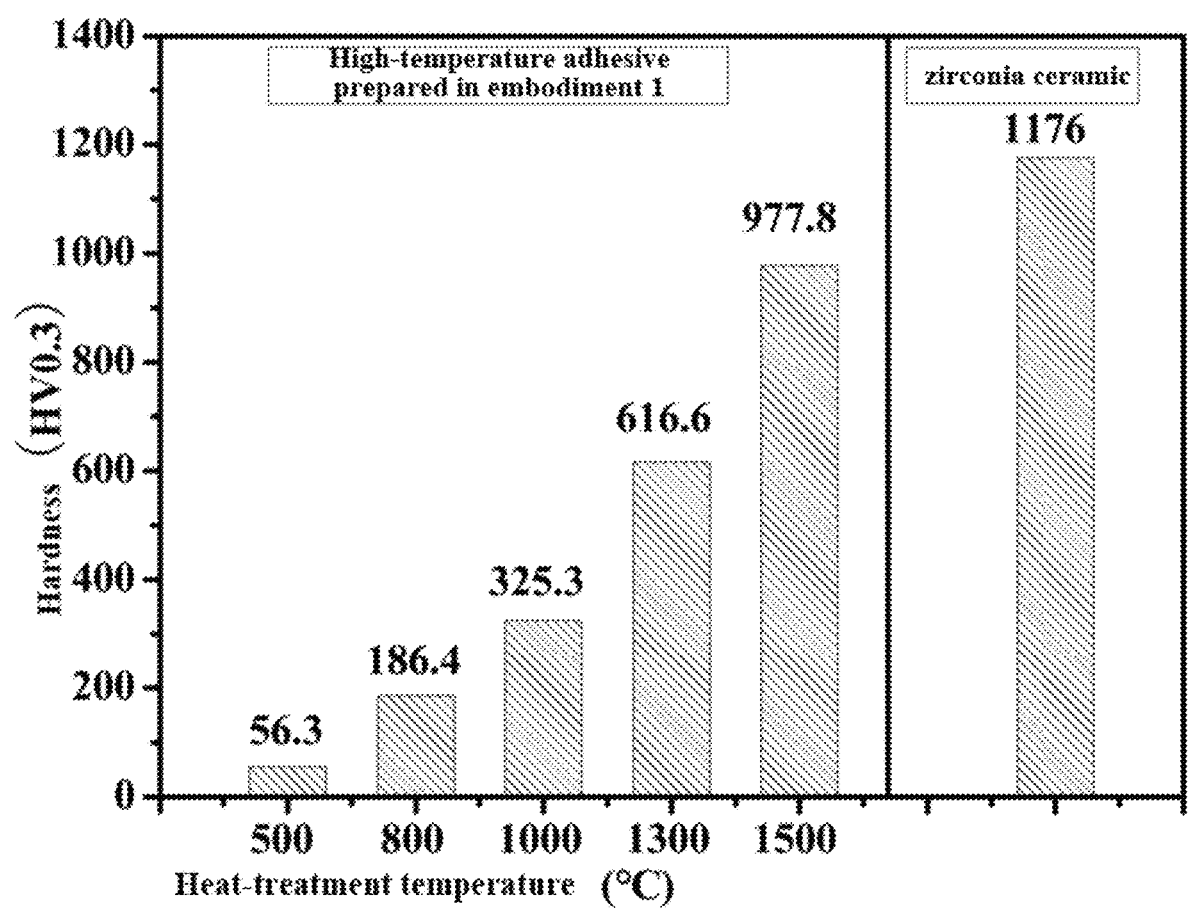
FIG. 3 illustrates a hardness comparison between the high-temperature adhesives prepared in the embodiment 1 after being treated at temperatures 500° C., 800° C., 1000° C., 1300° C., and 1500° C. and the zirconia ceramic.
Figure 4:
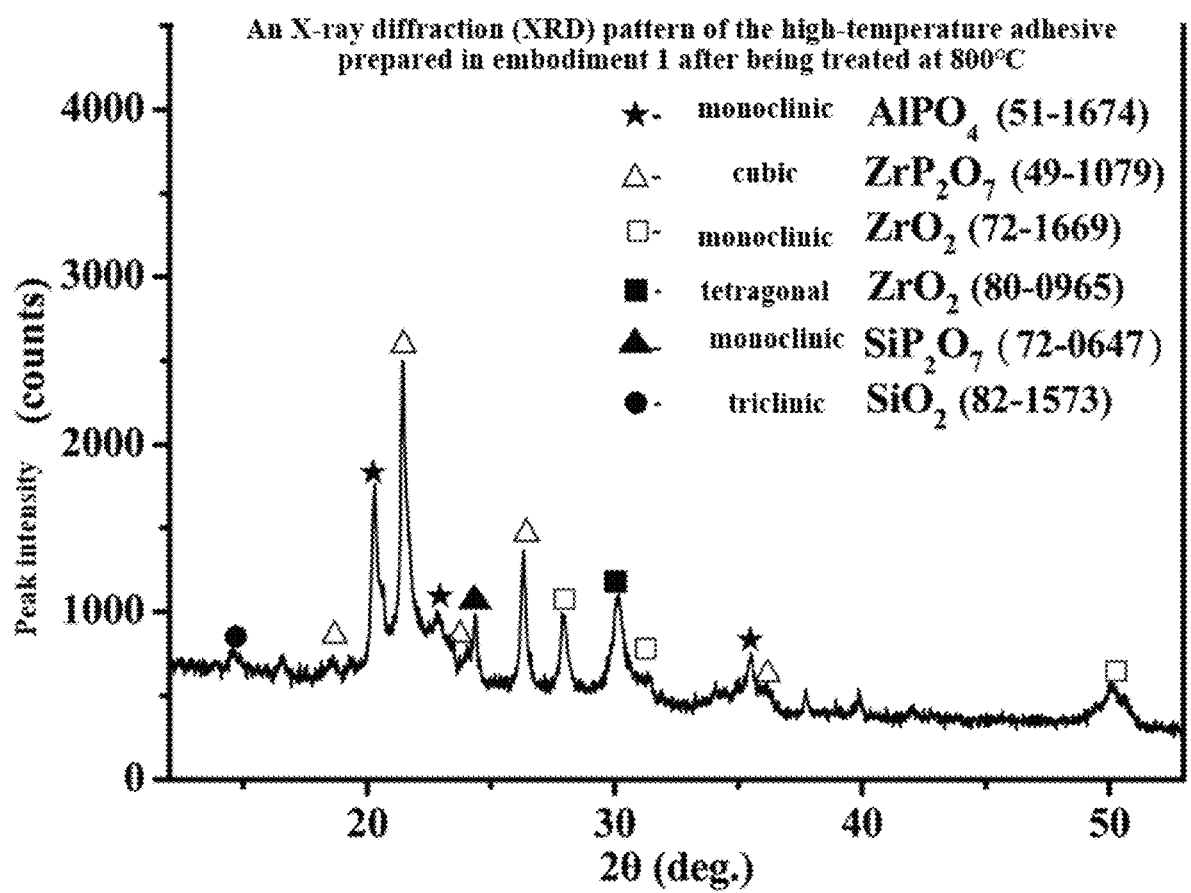

FIG. 4 illustrates an X-ray diffraction (XRD) pattern of the high-temperature adhesive prepared in the embodiment 1 after being treated at 800° C.

Figure 5:
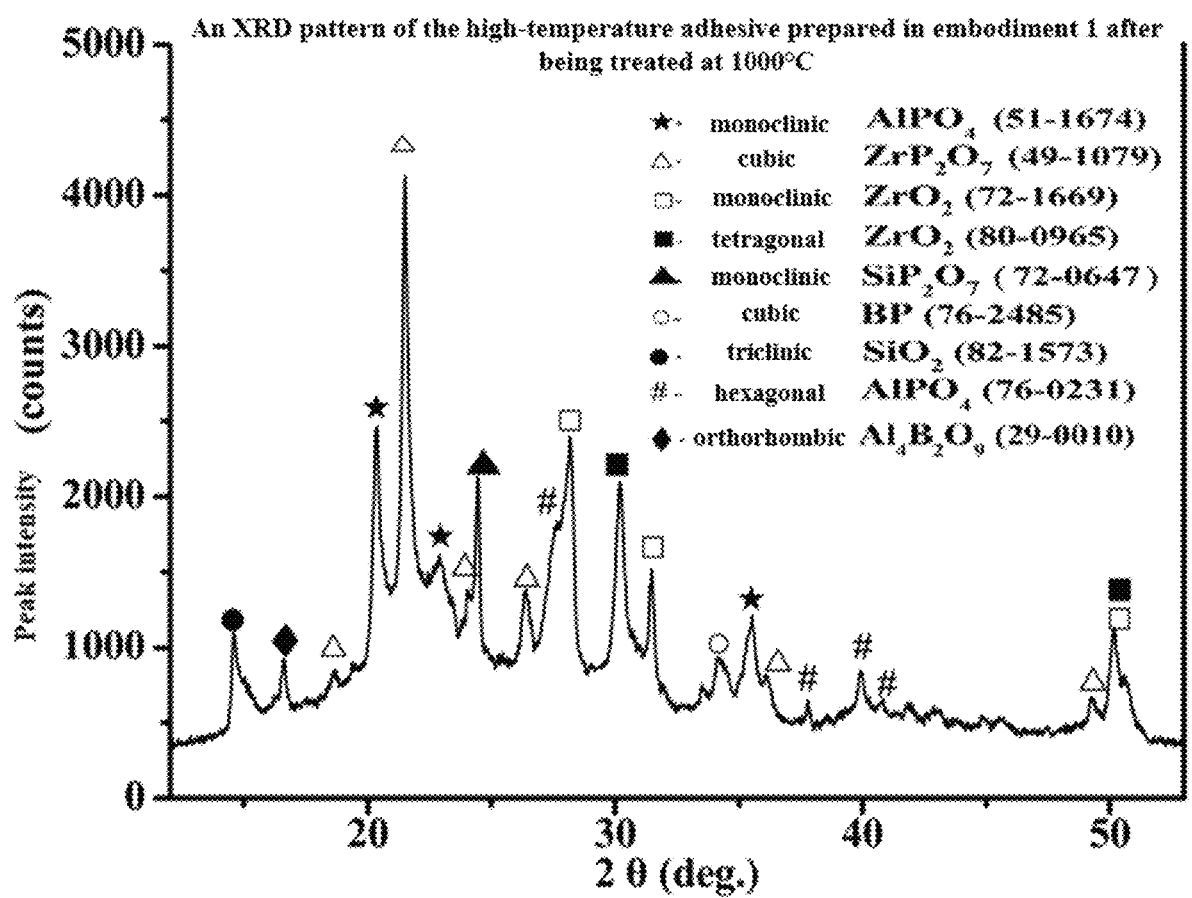

FIG. 5 illustrates an XRD pattern of the high-temperature adhesive prepared in the embodiment 1 after being treated at 1000° ° C.

Figure 6:
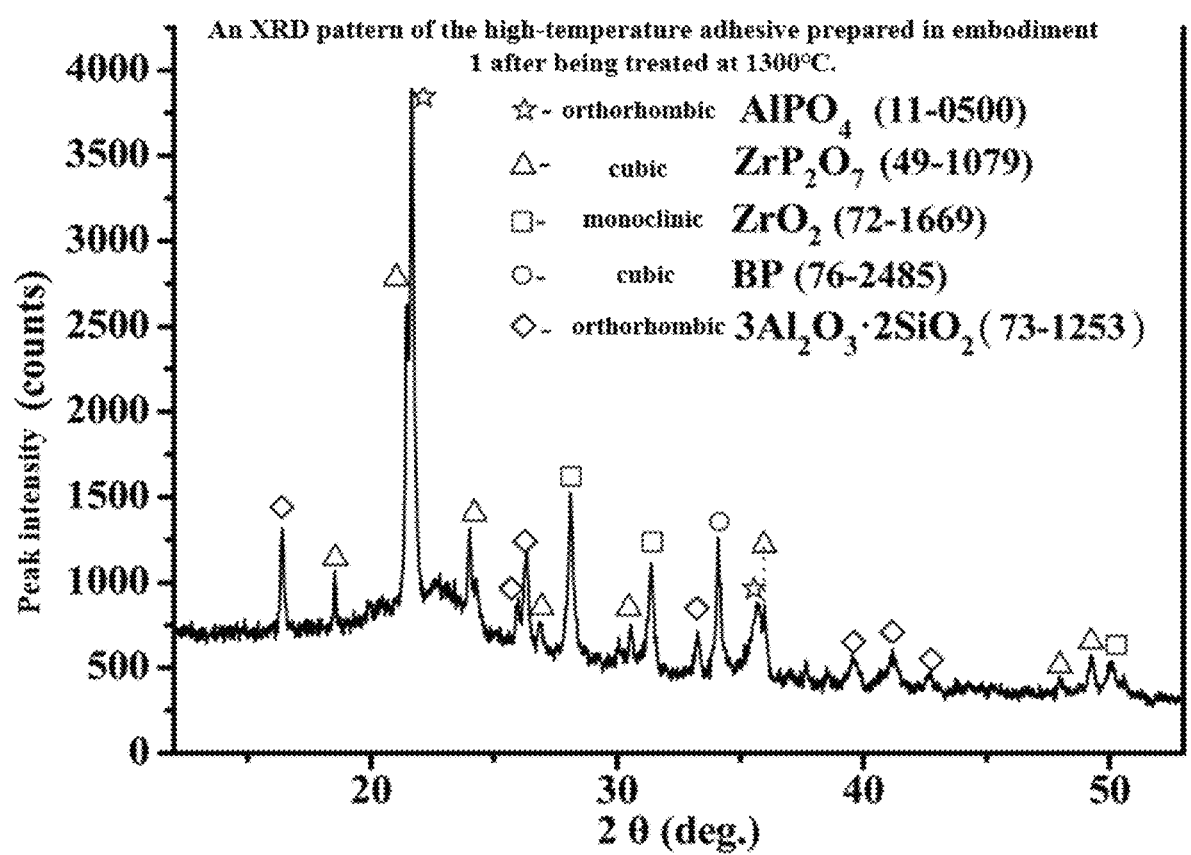

FIG. 6 illustrates an XRD pattern of the high-temperature adhesive prepared in the embodiment 1 after being treated at 1300° C.

Figure 7:
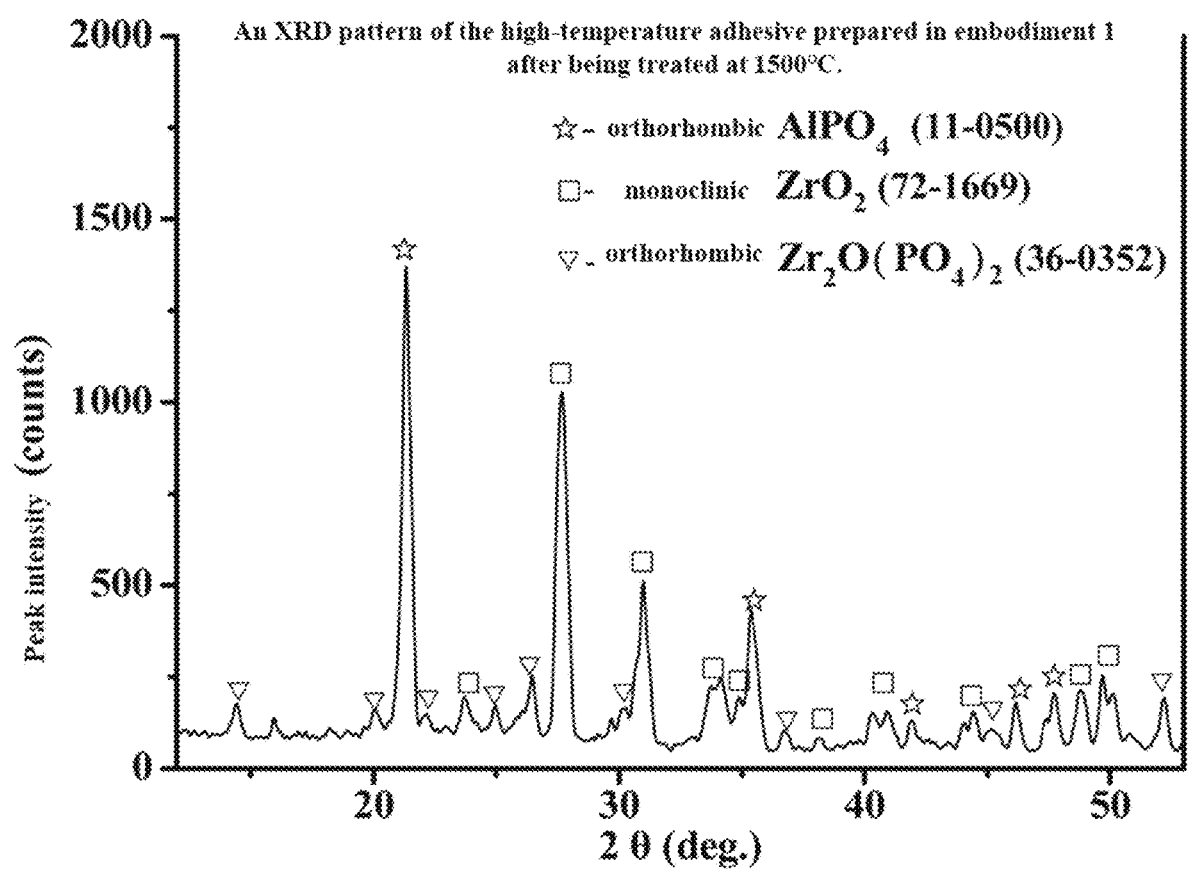

FIG. 7 illustrates an XRD pattern of the high-temperature adhesive prepared in the embodiment 1 after being treated at 1500° C.

Figure 8:
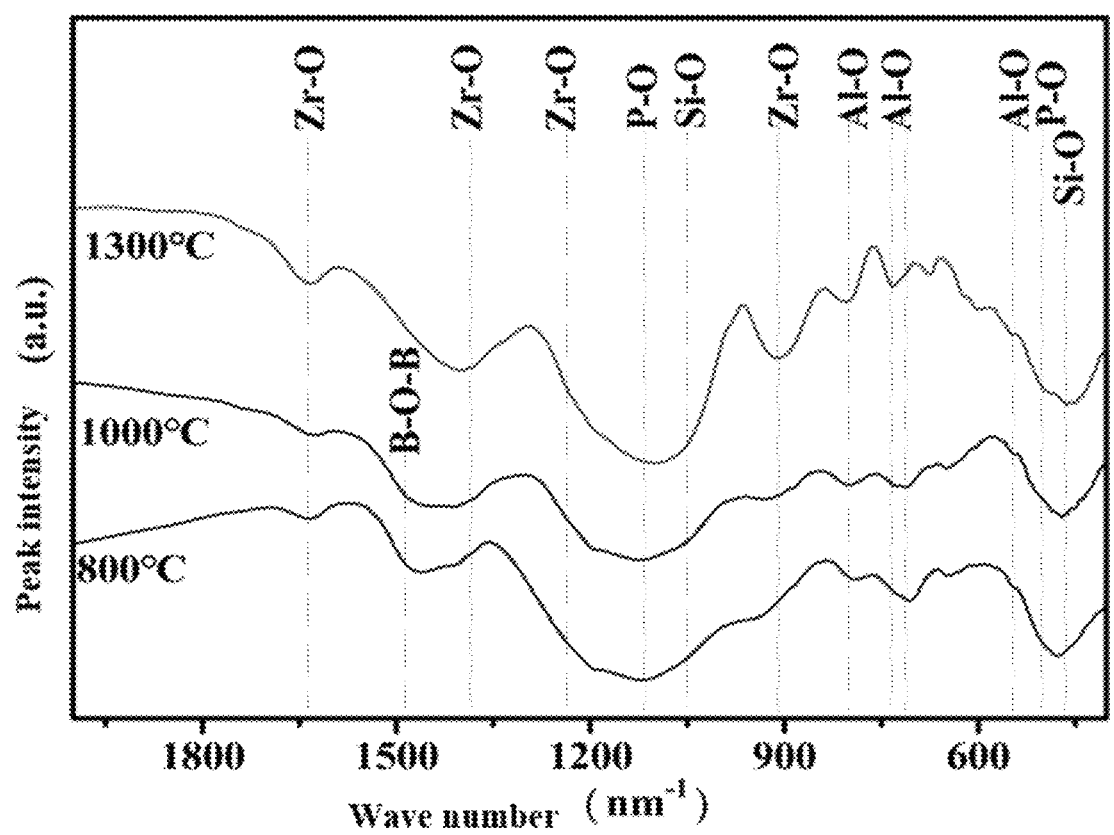

FIG. 8 illustrates an infrared spectrometer (IR) pattern of the high-temperature adhesives prepared in the embodiment 1 after being treated at 800° C., 1000° C., and 1300° C.

Figure 9:
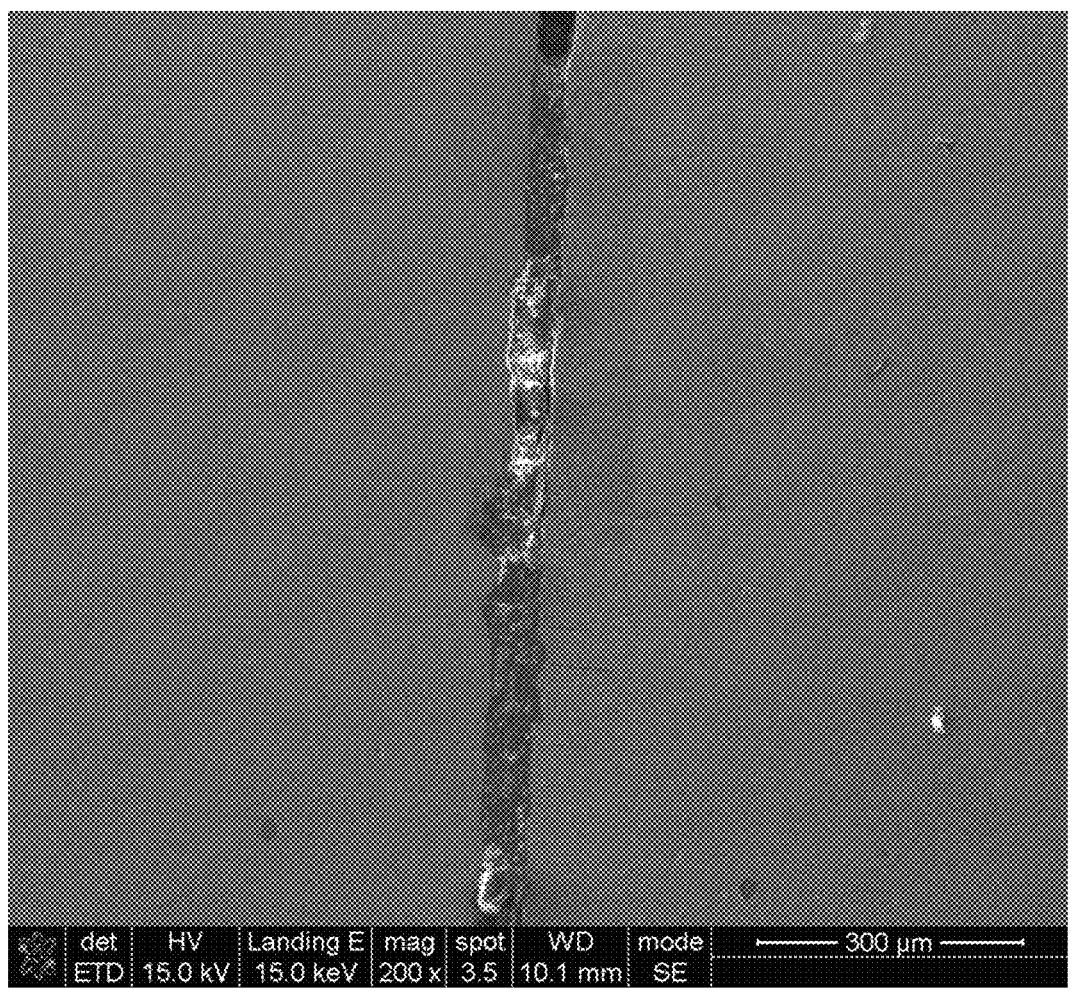

FIG. 9 illustrates a scanning electron microscope (SEM) pattern of a connecting surface of a connecting component of a zirconia ceramic connected with the high-temperature adhesive prepared in the embodiment 1 after being treated at 1300° ° C. (two sides of lines represent the zirconia ceramic and a middle line represents the high-temperature adhesive).

Figure 10:
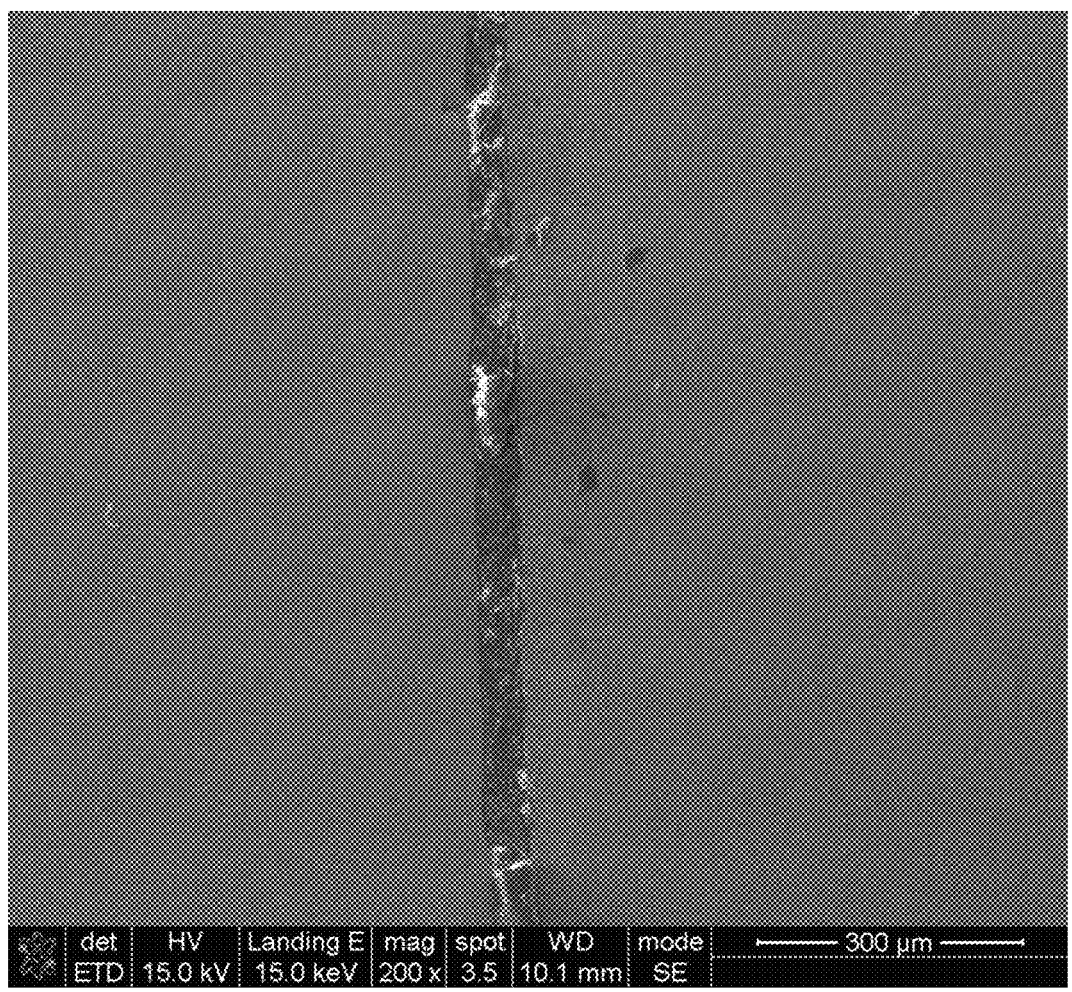

FIG. 10 illustrates an SEM pattern of a connecting surface of a connecting component of the zirconia ceramic connected with the high-temperature adhesive prepared in the embodiment 1 after being treated at 1500° C. (two sides of lines represent the zirconia ceramic and a middle line represents the high-temperature adhesive).

DETAILED DESCRIPTION OF EMBODIMENTS

The following will provide a clear and complete description of the technical solutions in the embodiments of the disclosure, in conjunction with the attached drawings. Apparently, the described embodiments are only a part of the embodiments of the disclosure, not all of them. Based on the embodiments in the disclosure, all other embodiments obtained by those skilled in the art without creative labor fall within the scope of protection of the disclosure.

Referring to FIGS. 1-10, the technical solutions are as follows.

Embodiment 1

A preparation method of heat-resistant adhesive of silicon-boron-carbon-zirconium modified aluminum-zirconium phosphate for zirconium oxide ceramics is provided and includes the following steps in that order.

Step 1, a concentrated phosphoric acid is added into a three-necked flask, and the three-necked flask is placed in a thermostat water bath cauldron for heating at a constant temperature of 80° C., followed by adding water in the three-necked flask to dilute the concentrated phosphoric acid in the three-necked flask to obtain a diluted phosphoric acid with a concentration of 60%. Mechanical stirring is performed on the diluted phosphoric acid at a rotation speed of 300 revolutions per minute (r/min), and aluminum hydroxide is added into the diluted phosphoric acid during the performing mechanical stirring on the diluted phosphoric acid, to obtain a first mixed solution, a solid-liquid mass ratio of the aluminum hydroxide:the diluted phosphoric acid is 1:2.3. Mechanical stirring is performed on the first mixed solution at a rotation speed of 700 r/min for 8 hours for reacting, to thereby obtain a first reacted mixture. An entire process of the reacting is performed under a condition of installing a condensation reflux device. And the first reacted mixture is filtered to remove residues from the first reacted mixture to thereby obtain an aluminum phosphate solution in milky white.

Step 2, the aluminum phosphate solution obtained in step 1 is transferred into a magnetic driven reactor, stirring is performed on the aluminum phosphate solution at a rotation speed of 300 r/min, and zirconium hydroxide is added into the aluminum phosphate solution during the performing stirring on the aluminum phosphate solution, to obtain a second mixed solution, a molar ratio of zirconium in the zirconium hydroxide:aluminum in the aluminum phosphate solution is 1:2.5. The second mixed solution is sealed in the magnetic driven reactor, and stirring is performed on the second mixed solution at a rotation speed of 300 r/min under a temperature of 100° C. for 16 hours for reacting, to thereby obtain a second reacted mixture. And the second reacted mixture is filtered to remove residues from the second reacted mixture, to thereby obtain an adhesive base solution in milky white.

Step 3, a zirconium n-propoxide solution is mixed with an anhydrous ethanol solution to obtain a third mixed solution, a molar ratio of the zirconium n-propoxide solution:the anhydrous ethanol solution is 1:10. And then acetylacetone solution is added into the third mixed solution at a molar ratio of zirconium n-propoxide in the zirconium n-propoxide solution:acetylacetone in the acetylacetone solution is 1:1.5, followed by stirring at a rotation speed of 450 r/min for 45 hours to obtain a zirconium gel solution.

Step 4, a silicon powder, a graphite powder, and a boron carbide powder are mixed at a mass ratio of the silicon powder:the graphite powder:the boron carbide powder of 3:1:2.5 to obtain a mixed powder. Then the mixed powder is added into the zirconium gel solution at a solid-liquid ratio of the mixed powder:the zirconium gel solution of 1:12, followed by mechanical stirring at a rotation speed of 600 r/min for 30 hours for reacting, to thereby obtain a third reacted mixture. The third reacted mixture is placed in an oven for drying the third reacted mixture at a temperature of 85° C. to thereby obtain a dried solid. And the dried solid is grinded to obtain a reacted powder in brownish black.

Step 5, the reacted powder is compressed by using a tablet press to obtain a cake-like solid at a pressure of 2.5 megapascals (MPa). Then the cake-like solid is placed in a tube furnace protected by an argon gas for cracking the cake-like solid to thereby obtain a calcined solid, a flow rate of the argon gas is 8 cubic centimeters per minute (cc/min), a period for the cracking is 2 hours, a temperature for the cracking is 500° C. And the calcined solid is crushed and grounded to obtain a reactive silicon-boron-carbon-zirconium powder with a particle size corresponding to 200 meshes as an adhesive filler.

Step 6, the adhesive base solution obtained in step 2 is mixed with the adhesive filler obtained in step 5 at a mass ratio of the adhesive base solution:the adhesive filler of 4:1 to obtain a mixture. And mechanical stirring is performed on the mixture at a rotation speed of 700 r/min for 10 hours, to thereby obtain the heat-resistant adhesive of silicon-boron-carbon-zirconium modified aluminum-zirconium phosphate.

Embodiment 2

A preparation method of heat-resistant adhesive of silicon-boron-carbon-zirconium modified aluminum-zirconium phosphate for zirconium oxide ceramics is provided and includes the following steps in that order.

Step 1, a concentrated phosphoric acid is added into a three-necked flask, and the three-necked flask is placed in a thermostat water bath cauldron for heating at a constant temperature of 70° C., followed by adding water in the three-necked flask to dilute the concentrated phosphoric acid in the three-necked flask to obtain a diluted phosphoric acid with a concentration of 50%. Mechanical stirring is performed on the diluted phosphoric acid at a rotation speed of 250 r/min, and aluminum hydroxide is added into the diluted phosphoric acid during the performing mechanical stirring on the diluted phosphoric acid, to obtain a first mixed solution, a solid-liquid mass ratio of the aluminum hydroxide:the diluted phosphoric acid is 1:3.8. Mechanical stirring is performed on the first mixed solution at a rotation speed of 500 r/min for 6 hours for reacting, to thereby obtain a first reacted mixture. An entire process of the reacting is performed under a condition of installing a condensation reflux device. And the first reacted mixture is filtered to remove residues from the first reacted mixture to thereby obtain an aluminum phosphate solution in milky white.

Step 2, the aluminum phosphate solution obtained in step 1 is transferred into a magnetic driven reactor, stirring is performed on the aluminum phosphate solution at a rotation speed of 200 r/min, and zirconium hydroxide is added into the aluminum phosphate solution during the performing stirring on the aluminum phosphate solution, to obtain a second mixed solution, a molar ratio of zirconium in the zirconium hydroxide:aluminum in the aluminum phosphate solution is 1:3. The second mixed solution is sealed in the magnetic driven reactor, and stirring is performed on the second mixed solution at a rotation speed of 200 r/min under a temperature of 80° C. for 12 hours for reacting, to thereby obtain a second reacted mixture. And the second reacted mixture is filtered to remove residues from the second reacted mixture, to thereby obtain an adhesive base solution in milky white.

Step 3, a zirconium n-propoxide solution is mixed with an anhydrous ethanol solution to obtain a third mixed solution, a molar ratio of the zirconium n-propoxide solution:the anhydrous ethanol solution is 1:7. And then acetylacetone solution is added into the third mixed solution at a molar ratio of zirconium n-propoxide in the zirconium n-propoxide solution:acetylacetone in the acetylacetone solutionis 1:2, followed by stirring at a rotation speed of 400 r/min for 50 hours to obtain a zirconium gel solution.

Step 4, a silicon powder, a graphite powder, and a boron carbide powder are mixed at a mass ratio of the silicon powder:the graphite powder:the boron carbide powder of 2:1:2 to obtain a mixed powder. Then the mixed powder is added into the zirconium gel solution at a solid-liquid ratio of the mixed powder:the zirconium gel solution of 1:15, followed by mechanical stirring at a rotation speed of 500 r/min for 36 hours for reacting, to thereby obtain a third reacted mixture. The third reacted mixture is placed in an oven for drying the third reacted mixture at a temperature of 90° ° C. to thereby obtain a dried solid. And the dried solid is grinded to obtain a reacted powder in brownish black.

Step 5, the reacted powder is compressed by using a tablet press to obtain a cake-like solid at a pressure of 4 MPa. Then the cake-like solid is placed in a tube furnace protected by an argon gas for cracking the cake-like solid to thereby obtain a calcined solid, a flow rate of the argon gas is 10 cc/min, a period for the cracking is 3 hours, a temperature for the cracking is 450° C. And the calcined solid is crushed and grounded to obtain a reactive silicon-boron-carbon-zirconium powder with a particle size corresponding to 250 meshes as an adhesive filler.

Step 6, the adhesive base solution obtained in step 2 is mixed with the adhesive filler obtained in step 5 at a mass ratio of the adhesive base solution:the adhesive filler of 4:1 to obtain a mixture. And mechanical stirring is performed on the mixture at a rotation speed of 600 r/min for 8 hours, to thereby obtain the heat-resistant adhesive of silicon-boron-carbon-zirconium modified aluminum-zirconium phosphate.

Embodiment 3

A preparation method of heat-resistant adhesive of silicon-boron-carbon-zirconium modified aluminum-zirconium phosphate for zirconium oxide ceramics is provided and includes the following steps in that order.

Step 1, a concentrated phosphoric acid is added into a three-necked flask, and the three-necked flask is placed in a thermostat water bath cauldron for heating at a constant temperature of 85° C., followed by adding water in the three-necked flask to dilute the concentrated phosphoric acid in the three-necked flask to obtain a diluted phosphoric acid with a concentration of 70%. Mechanical stirring is performed on the diluted phosphoric acid at a rotation speed of 350 r/min, and aluminum hydroxide is added into the diluted phosphoric acid during the performing mechanical stirring on the diluted phosphoric acid, to obtain a first mixed solution, a solid-liquid mass ratio of the aluminum hydroxide:the diluted phosphoric acid is 1:1.4. Mechanical stirring is performed on the first mixed solution at a rotation speed of 900 r/min for 8 hours for reacting, to thereby obtain a first reacted mixture. An entire process of the reacting is performed under a condition of installing a condensation reflux device. And the first reacted mixture is filtered to remove residues from the first reacted mixture to thereby obtain an aluminum phosphate solution in milky white.

Step 2, the aluminum phosphate solution obtained in step 1 is transferred into a magnetic driven reactor, stirring is performed on the aluminum phosphate solution at a rotation speed of 400 r/min, and zirconium hydroxide is added into the aluminum phosphate solution during the performing stirring on the aluminum phosphate solution, to obtain a second mixed solution, a molar ratio of zirconium in the zirconium hydroxide:aluminum in the aluminum phosphate solution is 1:1.8. The second mixed solution is sealed in the magnetic driven reactor, and stirring is performed on the second mixed solution at a rotation speed of 400 r/min under a temperature of 120° C. for 18 hours for reacting, to thereby obtain a second reacted mixture. And the second reacted mixture is filtered to remove residues from the second reacted mixture, to thereby obtain an adhesive base solution in milky white.

Step 3, a zirconium n-propoxide solution is mixed with an anhydrous ethanol solution to obtain a third mixed solution, a molar ratio of the zirconium n-propoxide solution:the anhydrous ethanol solution is 1:11. And then acetylacetone solution is added into the third mixed solution at a molar ratio of zirconium n-propoxide in the zirconium n-propoxide solution:acetylacetone in the acetylacetone solutionis 1:1.5, followed by stirring at a rotation speed of 500 r/min for 40 hours to obtain a zirconium gel solution.

It should be noted that in the disclosure, relational terms such as first and second are only used to distinguish one entity or operation from another entity or operation, and do not necessarily require or imply any actual relationship or order between these entities or operations. Moreover, the terms "include", "contain", or any other variation thereof are intended to encompass non-exclusive inclusion, such that a process, method, item, or device that includes a series of elements not only includes those elements, but also includes other elements that are not explicitly listed, or also includes elements inherent to such process, method, item, or device.

Although embodiments of the disclosure have been shown and described, it can be understood by those skilled in the art that multiple variations, modifications, substitutions, and variations can be made to these embodiments without departing from the principles and spirit of the disclosure. The scope of the present invention is limited by the accompanying claims and their equivalents.

What is claimed is:

1. A preparation method of heat-resistant adhesive of silicon-boron-carbon-zirconium modified aluminum-zirconium phosphate for zirconium oxide ceramics, comprising:

step 1, adding a concentrated phosphoric acid into a three-necked flask, and placing the three-necked flask in a thermostat water bath cauldron for heating at a constant temperature in a range of 70-80° C., followed by adding water in the three-necked flask to dilute the concentrated phosphoric acid in the three-necked flask to obtain a diluted phosphoric acid with a concentration of 50-70%; performing mechanical stirring on the diluted phosphoric acid at a rotation speed in a range of 250-350 revolutions per minute (r/min), and adding aluminum hydroxide into the diluted phosphoric acid during the performing mechanical stirring on the diluted phosphoric acid, to obtain a first mixed solution, a solid-liquid mass ratio of the aluminum hydroxide:the diluted phosphoric acid being in a range of 1:1.4-3.8; performing mechanical stirring on the first mixed solution at a rotation speed in a range of 500-900 r/min for 6-8 hours for reacting, to thereby obtain a first reacted mixture; and filtering the first reacted mixture to remove residues from the first reacted mixture to thereby obtain an aluminum phosphate solution in milky white; wherein an entire process of the reacting is performed under a condition of installing a condensation reflux device;

step 2, transferring the aluminum phosphate solution obtained in step 1 into a magnetic driven reactor, performing stirring on the aluminum phosphate solution at a rotation speed in a range of 200-400 r/min, and adding zirconium hydroxide to the aluminum phosphate solution during the performing stirring on the aluminum phosphate solution, to obtain a second mixed solution, a molar ratio of zirconium in the zirconium hydroxide:aluminum in the aluminum phosphate solution being in a range of 1:1.8-3; sealing the second mixed solution in the magnetic driven reactor, and performing stirring on the second mixed solution at a rotation speed in a range of 200-400 r/min under a temperature of 80-120° C. for 12-18 hours for reacting, to thereby obtain a second reacted mixture; and filtering the second reacted mixture to remove residues from the second reacted mixture, to thereby obtain an adhesive base solution in milky white;

step 3, mixing a zirconium n-propoxide solution with an anhydrous ethanol solution to obtain a third mixed solution, a molar ratio of the zirconium n-propoxide solution:the anhydrous ethanol solution being in a range of 1:7-11, and then adding acetylacetone solution to the third mixed solution at a molar ratio of zirconium n-propoxide in the zirconium n-propoxide solution:acetylacetone in the acetylacetone solution being in a range of 1:1.5-2, followed by stirring at a rotation speed in a range of 400-500 r/min for 40-50 hours to obtain a zirconium gel solution;

step 4, mixing a silicon powder, a graphite powder, and a boron carbide powder at a mass ratio of the silicon powder:the graphite powder:the boron carbide powder in a range of 3-5:1-1.5:2-4 to obtain a mixed powder, then adding the mixed powder into the zirconium gel solution obtained in step 3 at a solid-liquid ratio of the mixed powder:the zirconium gel solution in a range of 1:10-15, followed by mechanical stirring at a rotation speed in a range of 500-700 r/min for 24-36 hours for reacting, to thereby obtain a third reacted mixture, placing the third reacted mixture in an oven for drying the third reacted mixture at a temperature of 80-90° C. to thereby obtain a dried solid; and grinding the dried solid to obtain a reacted powder in brownish black;

step 5, compressing, by using a tablet press, the reacted powder obtained in step 4 to obtain a cake-like solid at a pressure in a range of 2-4 megapascals (MPa), and then placing the cake-like solid in a tube furnace protected by an argon gas for cracking the cake-like solid to thereby obtain a calcined solid, a flow rate of the argon gas being in a range of 6-10 cubic centimeters per minute (cc/min), a period for the cracking being in a range of 2-4 hours, a temperature for the cracking being in a range of 450-550° C.; and crushing and grounding the calcined solid to obtain a reactive silicon-boron-carbon-zirconium powder with a particle size corresponding to 200-300 meshes as an adhesive filler; and step 6, mixing the adhesive base solution obtained in step 2 with the adhesive filler obtained in step 5 at a mass ratio of the adhesive base solution:the adhesive filler in a range of 4:1-5:1 to obtain a mixture, and performing mechanical stirring on the mixture at a rotation speed in a range of 600-800 r/min for 8-12 hours, to thereby obtain the heat-resistant adhesive of silicon-boron-carbon-zirconium modified aluminum-zirconium phosphate.

2. The preparation method of heat-resistant adhesive of silicon-boron-carbon-zirconium modified aluminum-zirconium phosphate for zirconium oxide ceramics as claimed in claim 1, wherein each of the concentrated phosphoric acid and the aluminum hydroxide in step 1 is an analytical reagent (AR), a concentration of the concentrated phosphoric acid is 85%, a purity of the aluminum hydroxide is 99%, and a particle size of the aluminum hydroxide is in a range of 10-25 micrometers (μm).

3. The preparation method of heat-resistant adhesive of silicon-boron-carbon-zirconium modified aluminum-zirconium phosphate for zirconium oxide ceramics as claimed in claim 1, wherein a purity of the zirconium hydroxide in step 2 is 97%.

4. The preparation method of heat-resistant adhesive of silicon-boron-carbon-zirconium modified aluminum-zirconium phosphate for zirconium oxide ceramics as claimed in claim 1, wherein each of the zirconium n-propoxide solution, the anhydrous ethanol, and the acetylacetone solution in step 3 is an AR, a composition of the zirconium n-propoxide solution comprises $C_{12}H_{48}O_4Zr$, a concentration of the zirconium n-propoxide solution is 70%, a concentration of the anhydrous ethanol is 99.7%, and a concentration of the acetylacetone solution is 99%.

5. The preparation method of heat-resistant adhesive of silicon-boron-carbon-zirconium modified aluminum-zirconium phosphate for zirconium oxide ceramics as claimed in claim 1, wherein a particle size of the silicon powder in step 4 is 40-60 nanometers (nm), and particle sizes of the graphite powder and the boron carbide powder are in a range of 6-10 μm.

6. The preparation method of heat-resistant adhesive of silicon-boron-carbon-zirconium modified aluminum-zirconium phosphate for zirconium oxide ceramics as claimed in claim 1, wherein a purity of the argon gas in step 5 is greater than 99.95%.

\* \* \* \* \*